(12) United States Patent
Reisbick

(10) Patent No.: US 11,638,299 B2
(45) Date of Patent: Apr. 25, 2023

(54) EXPEDITING SENSOR REPORTING IN A TIME DIVISION MULTIPLE ACCESS SHARED-MEDIUM NETWORK

(71) Applicant: DISH Wireless L.L.C., Englewood, CO (US)

(72) Inventor: Richard Reisbick, Westminster, CO (US)

(73) Assignee: DISH Wireless L.L.C., Littleton, CO (US)

( * ) Notice: Subject to any disclaimer, the term of this patent is extended or adjusted under 35 U.S.C. 154(b) by 64 days.

(21) Appl. No.: 17/211,654

(22) Filed: Mar. 24, 2021

(65) Prior Publication Data
US 2021/0321453 A1  Oct. 14, 2021

Related U.S. Application Data

(60) Provisional application No. 63/009,753, filed on Apr. 14, 2020.

(51) Int. Cl.
| | | |
|---|---|---|
| *H04W 74/02* | (2009.01) | |
| *H04W 4/38* | (2018.01) | |
| *H04L 5/00* | (2006.01) | |
| *H04W 72/0446* | (2023.01) | |
| *H04W 72/12* | (2023.01) | |

(52) U.S. Cl.
CPC ........... *H04W 74/02* (2013.01); *H04L 5/0055* (2013.01); *H04W 4/38* (2018.02); *H04W 72/0446* (2013.01); *H04W 72/12* (2013.01)

(58) Field of Classification Search
CPC ... H04W 74/02; H04W 4/38; H04W 72/0446; H04W 72/1205; H04L 5/0055
See application file for complete search history.

(56) References Cited

U.S. PATENT DOCUMENTS

2005/0122231 A1   6/2005  Varaiya et al.
2016/0353475 A1*  12/2016  Au .................. H04L 5/0042
(Continued)

OTHER PUBLICATIONS

Sebastian Hanigk "RSQ-MAC: A robust, self-organising, hybrid TDMA/OFDMA medium access protocol for vehicular, sensor, and tactical ad-hoc networks," Communication Systems (ICCS), 2010 IEEE International Conference ON, IEEE, Piscataway, NJ, USA, Nov. 17, 2010, pp. 534-539, XP031848431 (Year: 2010).*

(Continued)

*Primary Examiner* — Chae S Lee
(74) *Attorney, Agent, or Firm* — Kilpatrick Townsend & Stockton, LLP

(57) ABSTRACT

Various arrangements for expediting sensor reporting in a wireless hybrid time division multiple access (TDMA) shared-medium network are presented. A TDMA channel allocation process for the wireless hybrid TDMA shared-medium network may be performed such that each sensor device of a plurality of sensor devices is assigned a different timeslot. Within each timeslot of the plurality of timeslots, a grant-free transmission window may be reserved. Any sensor device may be permitted to transmit data during any grant-free transmission window. In response to the sensor device determining the sensor data is to be transmitted, the sensor device may transmit a message indicative of the sensor data during a grant-free transmission window of a timeslot assigned to a different sensor device.

20 Claims, 7 Drawing Sheets

(56) References Cited

U.S. PATENT DOCUMENTS

2017/0098374 A1* 4/2017 Sullivan .............. G08G 1/0129
2017/0238270 A1* 8/2017 Shen ................ H04W 72/0446
370/336
2018/0035459 A1* 2/2018 Islam ................... H04L 5/0053

OTHER PUBLICATIONS

International Search Report and Written Opinion for PCT/US2021/027231 dated Jul. 22, 2021, all pages.
Sebastian Hanigk: "RSQ-MAC: A robust, self-organising, hybrid TDMA/OFDMA medium access protocol for vehicular, sensor, and tactical ad-hoc networks," Communication Systems (ICCS), 2010 IEEE International Conference ON, IEEE, Piscataway, NJ, USA, Nov. 17, 2010, pp. 534-539, XP031848431, ISBN: 978-1-4244-7004-4 the whole document.
Stangaciu Valentin et al: "General slot stealing TDMA scheme to improve the low channel utilization factor," 2015 IEEE $9^{th}$ International Symposium on Intelligent Signal Processing (WISP) Proceedings, IEEE, May 15, 2015, pp. 1-4, XP033168001, DOI: 10.1109/WISP.2015.7139151 [retrieved on Jun. 29, 2015] the whole document.

* cited by examiner

EXPEDITING SENSOR REPORTING IN A TIME DIVISION MULTIPLE ACCESS SHARED-MEDIUM NETWORK

CROSS-REFERENCE TO RELATED APPLICATION

This application claims priority to U.S. Provisional Patent Application No. 63/009,753, filed on Apr. 14, 2020, entitled "Methods and Systems for Expediting Sensor Reporting in a Time Division Multiple Access Shared-Medium Network," the entire disclosure of which is hereby incorporated by reference for all purposes.

BACKGROUND

Sensor devices can be configured to report data, such as sensor measurements, wirelessly to a host system using a time-division multiple access (TDMA) shared-medium network. In a TDMA shared-medium network, each sensor device can be assigned a timeslot. When the timeslot occurs, the corresponding sensor device is permitted to transmit data while the other sensor devices are prohibited from transmitting data.

Such an arrangement may work well with a limited number of sensor devices, for measuring time-insensitive phenomena, or both. However, if a large number of sensors are present, if the data being reported is time sensitive, or both, a TDMA shared-medium network may not work well. For example, if hundreds or thousands (or more) of sensor devices are present, a significant amount of time, such as a minute or more, may elapse between a particular sensor device's consecutive timeslots, thus resulting in a lag time between when measurements are made by the sensor device and when the measurements are reported to a remote system.

SUMMARY

Various arrangements for expediting sensor reporting in a wireless hybrid time division multiple access (TDMA) shared-medium network are presented herein. A wireless network host system may perform a TDMA channel allocation process for the wireless hybrid TDMA shared-medium network such that each sensor device of a plurality of sensor devices is assigned a different timeslot of a plurality of timeslots for data transmissions on the wireless hybrid TDMA shared-medium network. A grant-free transmission window may be reserved within (or immediately after) each timeslot of the plurality of timeslots. Any sensor device of the plurality of sensor devices may be permitted to transmit data during any grant-free transmission window. Sensor data may be measured by a sensor device. The sensor device may determine that the sensor data is to be transmitted to the wireless network host system prior to a next assigned timeslot assigned to the sensor device. In response to the sensor device determining the sensor data is to be transmitted, The sensor device may transmit a message indicative of the sensor data and an identifier of the sensor device during a grant-free transmission window of a timeslot assigned to a different sensor device of the plurality of sensor devices.

Various arrangements may include one or more of the following features: The wireless network host system may transmit, in response to receiving the message indicative of the sensor data and the identifier of the sensor device during the grant-free transmission window of the timeslot assigned to the different sensor device of the plurality of sensor devices, an acknowledgement message indicative of the message having been successfully received by the wireless network host system. The sensor device may determine, after a defined period of time, that no acknowledgement message indicative of the message having been successfully received by the wireless network host system has been received by the sensor device. In response to determining that no acknowledgment message has been received, the sensor device may wait a pseudo-random amount of time to retry transmission of the message. After waiting the pseudo-random amount of time, the sensor device may retransmit the message during a second grant-free transmission window of a second timeslot assigned to a second different sensor device of the plurality of sensor devices. The pseudo-random amount of time may be calculated based at least in part on the identifier of the sensor device. The sensor device may determine an amount of time until the timeslot that is assigned to the sensor device. The sensor device may determine that the amount of time until the timeslot is assigned to the sensor device exceeds a defined threshold amount of time. Transmitting the message by the sensor device may be further based on determining that the amount of time until the timeslot is assigned to the sensor device exceeds the defined threshold amount of time. The message may use a single bit to represent the sensor data. Each sensor device of the plurality of sensor devices may be a parking sensor that detects whether a vehicle is present in a parking space in which the parking sensor is installed. Each sensor device of the plurality of sensor devices may include a magnetometer. A duration of each grant-free transmission window of the plurality of timeslots may be increased based on an increase in a number of sensor devices present in the plurality of sensor devices.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
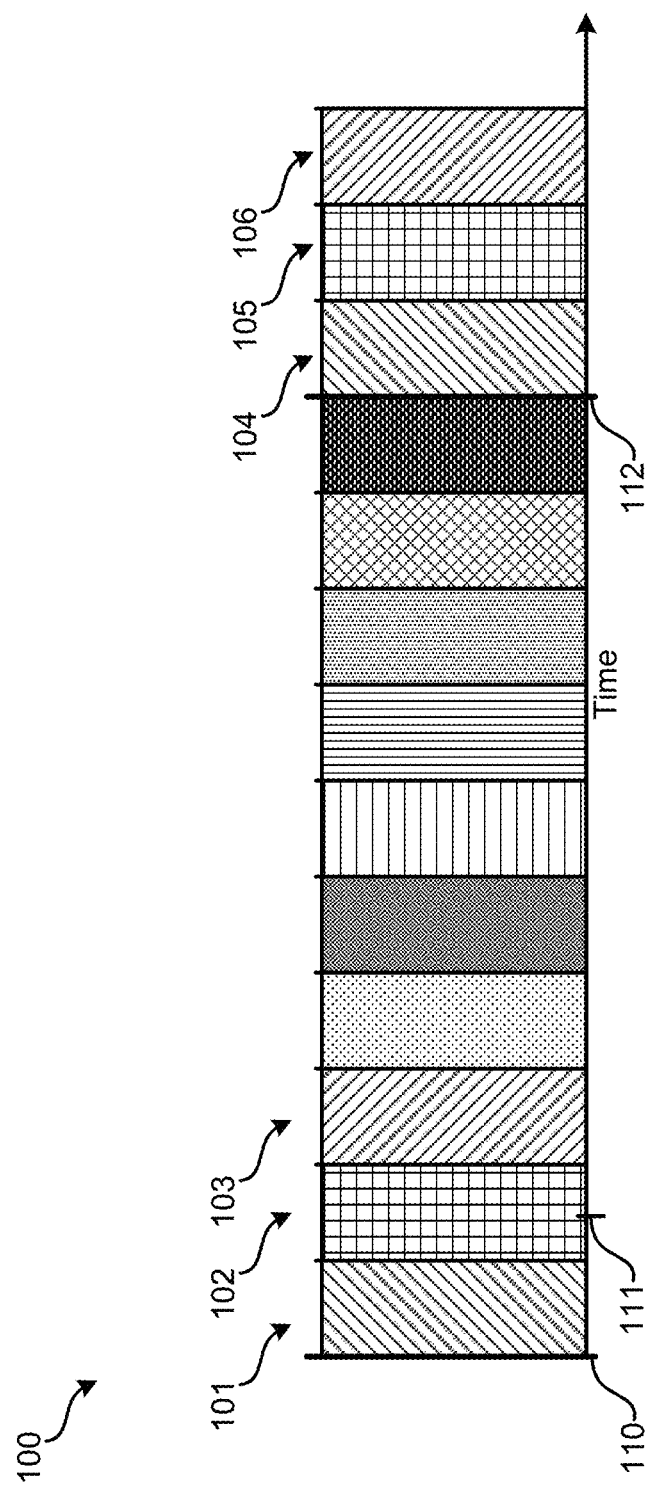
FIG. 1 illustrates an embodiment of timeslots in a time-division multiple access (TDMA) shared-medium network.

If a large number of sensors are present, if the data being reported is time sensitive, or both, a TDMA shared-medium network may result in data, such as sensor measurements, from one or more sensors being received by a host system with a significant amount of time lag. As an example, a parking sensor system can include a parking sensor being present in each parking space of a parking facility. If the parking facility has a large number of parking spaces, such as 1,500 parking spaces, a significant amount of time may elapse between timeslots during which a particular parking sensor is permitted to transmit. For example, even if each timeslot is only 0.05 s in duration, that could mean that each parking sensor is allotted a timeslot once every 75 seconds. Therefore, a significant amount of delay can exist between when a parking space is determined by the sensor to be occupied or unoccupied and when a network host system receives an indication of the correct state of the parking space. This situation could result in incorrect information being passed to a motorist, such as that a particular parking space is available even though another car has recently parked there or that a particular parking space is not available, even though another vehicle recently departed from the parking space.

While the above example is focused on parking space sensors, it should be understood that similar problems can exist for many types of sensor devices that report data using a TDMA shared-medium arrangement, such as a wireless TDMA shared-medium network. As an example, many types of specialized and generic 433 MHz sensor devices may use a wireless TDMA shared-medium network for communicating with a remote host system. Such sensor devices can include: weather sensors, crop sensors, water sensors, home automation sensors, alarm system sensors, and hazard sensors.

Embodiments detailed herein describe a hybrid TDMA shared-medium network in which each sensor device is assigned a timeslot. However, a portion of some or all timeslots are reserved for grant-free transmissions by any of the sensor devices. (Alternatively, embodiments herein can be understood as a time between subsequent timeslots is reserved for grant-free transmissions). If a sensor device has a message (e.g., an urgent message) to be sent to the host system, the sensor device can transmit during any grant-free transmission window without permission. The urgent message may be short, such as it may only include: an identifier of the sensor device and a status update (which could be as small as a single bit). For example, referring back to the parking sensor example, if a parking sensor detects a change in whether a vehicle is present, the parking sensor device may be programmed to classify this as urgent data. During a next grant-free transmission window, the sensor device may transmit its identifier and state data (e.g., a bit indicating whether a vehicle is present or not). Other data that is to be transmitted by the sensor device (e.g., magnetometer readings, battery level measurements, signal strength measurements) may wait until the sensor device's next assigned timeslot.

In some embodiments, an analysis may be performed by the sensor device to determine an amount of time between when urgent data is ready to be transmitted and when the sensor device's next assigned timeslot occurs. If the amount of time does not exceed a defined threshold, rather than transmitting using a grant-free transmission window, the urgent data may be stored and sent during the sensor device's next assigned timeslot.

If a grant-free transmission window is used to send an urgent message and an acknowledgement is not received by a sensor device in response to the urgent message, the urgent message may be determined by the sensor device to not have been received by the remote host system. Since any sensor device can transmit during a grant-free transmission window, it may be possible that a collision occurred in that multiple (two or more) sensor devices attempted to transmit during the same grant-free transmission window. By multiple sensor devices transmitting at the same time, none or only some of the transmitted data may be successfully received by the remote host system. In such a situation, each sensor device may wait a pseudorandom amount of time and then attempt to retransmit the urgent message during (likely different) future grant-free transmission windows. As previously discussed, if an amount of time remaining until a next assigned timeslot for the sensor device is below a stored threshold, the sensor device may store the urgent message and send during the sensor device's assigned timeslot.

FIG. 1 illustrates an embodiment 100 of timeslots in a time-division multiple access (TDMA) shared-medium network. In embodiment 100, ten timeslots are illustrated that periodically repeat. At time 110, timeslot 101 occurs, followed by timeslot 102, and followed by timeslot 103. Each of these timeslots is assigned to a different device as part of a TDMA shared-medium network. During timeslot 101, a first device is permitted to transmit wireless data according to a particular protocol. During timeslot 101, other devices that are part of the TDMA shared-medium network are prohibited from wirelessly transmitting any form of data to prevent collisions with the data being transmitted by the first device. During timeslot 102, a second device is permitted to transmit wireless data according to the particular protocol. During timeslot 102, other devices besides the second device are prohibited from wirelessly transmitting any form of data to prevent collisions with the data being transmitted by the second device. A similar pattern of one particular device being assigned and permitted to transmit during a particular timeslot is continued for other devices. In the illustrated embodiment 100, ten devices are present which are each assigned their own timeslot.

At time 112, all assigned timeslots have occurred and the timeslots begin repeating. Therefore, timeslot 104 corresponds to the same device as timeslot 101. Timeslot 105 corresponds to the same device as timeslot 102. And, timeslot 106 corresponds to the same wireless device as timeslot 103. The amount of time, T, that may elapse between the starts of consecutive timeslots assigned to a particular device can be indicated by Equation 1:

$$T = Q_{Devices} * \tau \qquad \text{Eq. 1}$$

In Equation 1, $Q_{Devices}$ is the total number of devices and $\tau$ is the duration of an individual timeslot assigned to a device.

According to the arrangement of embodiment 100, if the first device that is assigned to timeslot 101 determines that it has data that needs to be transmitted at time 111, the first device is required to wait until timeslot 104 to transmit the data. Assuming that the duration of each timeslot is relatively short, such in a system that only has ten devices, waiting until timeslot 104 may be tolerable, depending on how the sensor data is used by the host system. However, if individual device timeslots ($\tau$) are long in duration and/or there is a much larger number of devices ($Q_{Devices}$) that are each assigned a timeslot, the amount of time elapsing between timeslot 101 and timeslot 104 may be significant and may negatively impact the overall performance of a system.

Figure 2:
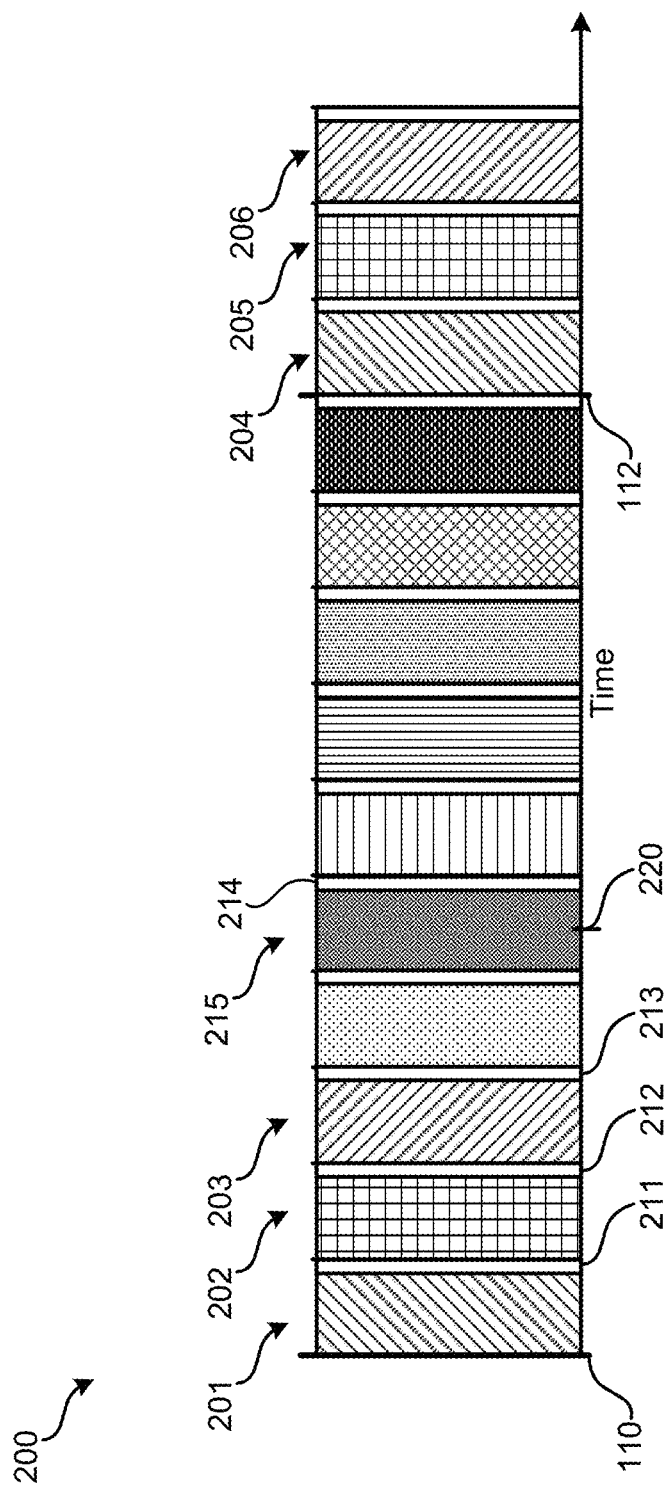
FIG. 2 illustrates an embodiment of timeslots in a hybrid TDMA shared-medium network with grant-free windows.

FIG. 2 illustrates an embodiment 100 of timeslots in a hybrid TDMA shared-medium network with grant-free windows. Embodiment 200 represents a significant modification from the arrangement of embodiment 100. In embodiment 200, a portion of each timeslot has been reserved for grant-free transmissions. Referring to timeslot 201, grant-free transmission window 211 has been reserved; for timeslot 202, grant-free transmission window 212 has been reserved; and for timeslot 203, grant-free transmission window 213 has been reserved, and so on. In embodiment 200, the timeslots assigned to individual devices periodically repeat. For example, timeslot 204 is assigned to the same device as timeslot 201, timeslot 205 is assigned to the same device as timeslot 202, and timeslot 206 is assigned to the same device as timeslot 203.

While during an individual timeslot only a particular device is permitted to transmit as detailed in relation to embodiment 100, during the reserved grant-free transmission windows, any device operating as part of the hybrid TDMA shared-medium network is permitted to transmit without first obtaining permission from any other device or host system. Therefore, for example, assuming that ten devices are present in the system communicating using the hybrid TDMA arrangement of embodiment 200, during timeslot 201 only a first device may be permitted to transmit; however, during grant-free transmission window 211 of timeslot 201, any of the devices that communicate using the hybrid TDMA shared-medium network may transmit. In embodiment 200, a grant-free transmission window is illustrated as occurring at the end of each timeslot; however, in other embodiments, grant-free transmission windows may occur at the start of each timeslot or even possibly for a duration of time within timeslots. The network host system can transmit a definition of when grant-free transmission windows are to occur to each device communicating using the hybrid TDMA shared-medium network.

The duration of grant-free transmission windows may represent a small percentage of the overall duration of the timeslot of which it is a part. For example, a grant-free transmission window may be less than 5%, 10%, 20%, or 30% of the duration of the entire timeslot. The duration of a grant-free transmission window of a timeslot may be set to be only long enough in order for the device to transmit: (1) an identifier of the device sending the grant-free transmission; and (2) a small number of bits representing data sensed by the device or a state of the device. For example, in some embodiments, a single bit may be used to represent data sensed by the device or the state of the device. In other embodiments, 100 or fewer bits may be sufficient to send a sensor measurement or other urgent data.

The duration of each individual grant-free transmission window may be based on the minimum or near minimum amount of bits that are necessary to be transmitted in order for an identifier of the device to be transmitted along with some number of bits representing the data sensed by the device or the stated device, which may be as small as a single bit. The number of bits representing the identifier of the device may be based on the number of devices present on the hybrid TDMA shared-medium network. For example, at minimum, four bits may be necessary to be used for an identifier if ten devices are present on the hybrid TDMA shared-medium network. If a greater number of devices is added to the hybrid TDMA shared-medium network, the number of bits used to identify each device may need to be increased such that each device can retain a unique identifier. Therefore, the duration of each individual grant-free transmission window may have to be increased to accommodate the transmission of a greater number of bits within the grant-free transmission window. For example, if ten devices are added to the hybrid TDMA shared-medium network of the previous example, to bring the total number of devices to 20, it may be necessary to use five bits, rather than four, such that each device can be represented with the unique identifier in binary. The duration of the individual grant-free transmission windows of each timeslot may need to be increased slightly to permit an additional bit to be transmitted. The adjustment of the duration may be performed by a network host system that coordinates assignments of the timeslots to devices. This adjustment can include increasing the overall duration of each timeslot to permit the additional data to be transmitted or can include adjusting the percentage of each timeslot assigned to grant-free transmissions, thereby decreasing the amount of the timeslot dedicated to the device assigned to the particular timeslot.

To contrast the delay between when important data may be transmitted to a network host system between embodiment 100 and embodiment 200, consider if a device assigned to timeslot 201 has data needing to be transmitted to the network host system at time 220. In embodiment 100, the device would need to wait until timeslot 204 to transmit the data. However, in embodiment 200, the device could attempt to transmit the data during grant-free transmission window 214 of timeslot 215. While timeslot 215 is not assigned to the device, the device (along with any other device of the hybrid TDMA shared-medium network) is permitted to transmit during grant-free transmission window 214, thereby allowing the data to be transmitted five timeslots early. While the example embodiment only has ten devices and corresponding timeslots, in other embodiments, dozens, hundreds, thousands of devices, or more may be present, resulting in the data being transmitted by the device to the network host system much sooner than if the device was required to wait until its next assigned timeslot.

In some embodiments, rather than having a grant-free transmission every time slot include a grant-free transmission window, a grant-free transmission window may only be present in some number of windows, such as every seventh window. In a timeslot that does not have a grant-free transmission window, one or more additional pieces of data (e.g., a specific data field) may be sent by the sensor device to the host system. In a timeslot that does have a grant-free transmission window, the one or more additional pieces of data (e.g., the specific data field) may not be sent by the sensor device to the host system, thus creating room for the grant-free transmission window.

Figure 3:
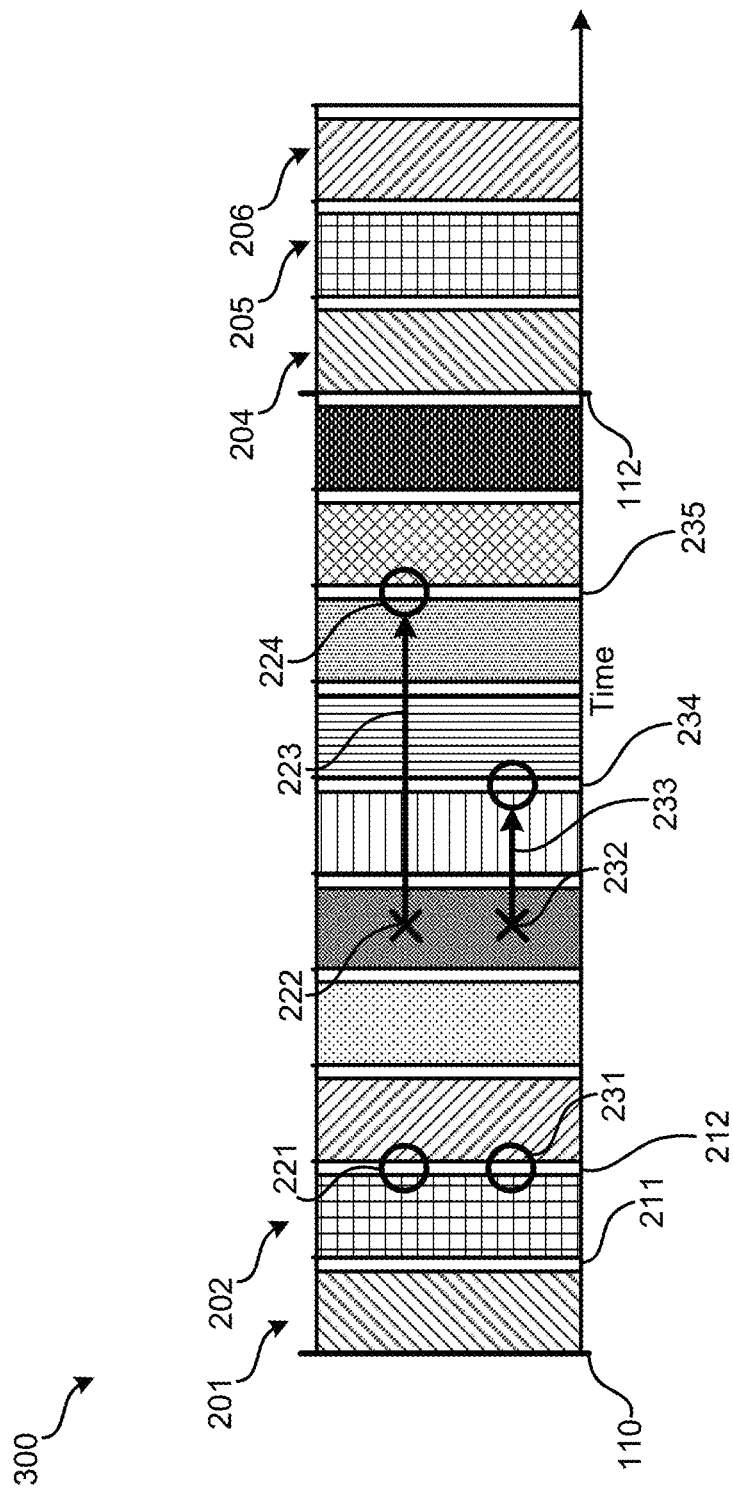
FIG. 3 illustrates an embodiment of timeslots in a hybrid TDMA shared-medium network with grant-free windows in which a collision has occurred.

Since during any grant-free transmission window any device operating as part of the hybrid TDMA shared-medium network can be transmitted without permission being granted by another device, such as a network host system, it can be possible that two or more devices may attempt to transmit during the same grant-free transmission window. By multiple devices transmitting during the same grant-free transmission window, the interference may result in a network host system not being able to successfully receive or interpret data from any of the devices that transmitted. When two or more devices transmit during a same grant-free transmission window, a "collision" occurs. It is also possible that data sent during a grant-free transmission window may not be received due to another reason, such as a weak signal or outside interference. FIG. 3 illustrates an embodiment 300 of timeslots in a hybrid TDMA shared-medium network with grant-free windows in which a collision has occurred.

In embodiment 300, a first wireless device transmitted data (as indicated by circle 221) during grant-free transmission window 212 of timeslot 202. A second wireless device also transmitted data (as indicated by circle 231) during grant-free transmission window 212 of timeslot 202. Neither device may be aware that another device also transmitted during grant-free transmission window 212. In response to transmitting during grant-free transmission window 212, each device may be expecting an acknowledgment message from the network host system (e.g., gateway 730 of FIG. 7). Each device may be listening for up to a predefined acknowledgement period of time for an acknowledgment message to be received from the network host system. At time 222, the first device may determine that an acknowledgment message has not been received within a predefined period of time during which the acknowledgement was expected. Similarly, at time 232, the second device may determine that an acknowledgment message has not been received within the predefined period of time during which the acknowledgement was expected.

In response to no acknowledgment being received by either device, each device may attempt to retransmit during a future grant-free transmission window of a timeslot. Which grant-free transmission window is used by each device may be selected individually by each device pseudorandomly. For example, a pseudorandom function may be performed based at least in part on the identifier of each device. Ideally, these pseudorandom functions will result in each device retransmitting the unacknowledged messages during different grant-free transmission windows of different timeslots. In embodiment 300, the pseudorandom function results in the first device waiting for time 223 and the unacknowledged message being retransmitted to the network host system during grant-free transmission window 235 at time 224. These pseudorandom functions also result in the second device waiting for time 233 and the unacknowledged message being retransmitted to the network host system during grant-free transmission window 234. If acknowledgments are received, each device may take no further action. If one of the devices fails to receive an acknowledgment again, it may again try to retransmit the message or, if a timeslot assigned to the device is occurring within a predefined period of time, the device may wait until its assigned timeslot.

Figure 4:
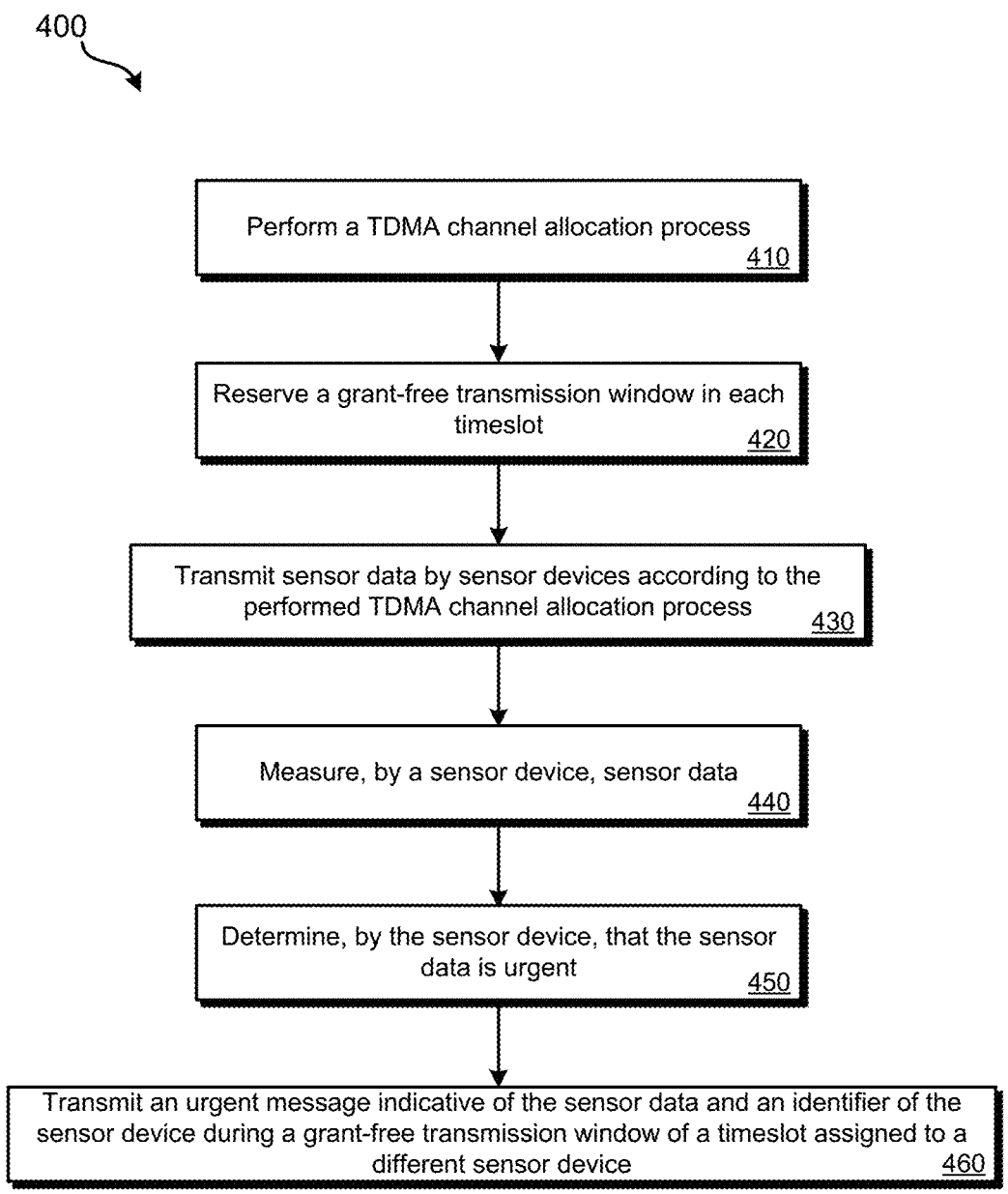
FIG. 4 illustrates an embodiment of a method for expediting sensor reporting in a hybrid TDMA shared-medium network.

Various methods may be performed using the hybrid TDMA shared-medium network arrangements of FIGS. 2 and 3. FIG. 4 illustrates an embodiment of a method 400 for expediting sensor reporting in a hybrid TDMA shared-medium network. Method 400 may be performed in part by a network host system (e.g., gateway 730 of FIG. 7) that is in communication with or is part of an access point (AP). For example, an AP may communicate wirelessly with each device that communicates, using the hybrid TDMA shared-medium network.

At block 410, a TDMA channel allocation process may be performed. The TDMA channel allocation process can include the network host system assigning a timeslot to each device that is to communicate using the hybrid TDMA shared-medium network. These devices may be sensor devices, such as parking space sensors that reside within parking spaces and use a magnetometer to detect whether a vehicle is present within the parking space. Following block 410, a separate timeslot may be assigned to each device. Therefore, for example, if 1000 devices are to use the hybrid TDMA shared-medium network, 1000 timeslots may be assigned.

The sensor devices that are used to perform method 400 (and other methods and arrangements detailed herein) can have one or more wireless or wired transceivers. Each transceiver can communicate using the hybrid TDMA shared-medium arrangements detailed herein. Additionally, the sensor devices can each have one or more non-transitory processor-readable mediums, one or more processors, and one or more sensor devices, such as a magnetometer and/or a time-of-flight sensor. The network host system can also have one or more transceivers that can communicate using the hybrid TDMA shared-medium arrangements detailed here. Additionally, the network host system can each have one or more non-transitory processor-readable mediums and one or more processors. The network host system can be configured to provide network configuration data to the sensor devices and modify the configuration of the hybrid TDMA shared-medium network as needed to increase efficiency and/or the number of sensor devices that can communicate via the hybrid TDMA shared-medium network.

At block 420, within each timeslot, a grant-free transmission window may be reserved by the network host system. Within the grant-free transmission window, any device that communicates as part of the hybrid TDMA shared-medium network may be permitted to transmit data without being explicitly authorized to do so during that window. In contrast, during the portion of the timeslot assigned to a particular device, only that particular device is permitted to transmit. Block 420 can include the network host system transmitting an indication to each device that communicates using the hybrid TDMA shared-medium network that indicates the duration and location of where grant-free transmission windows fall within the timeslots.

At block 430, sensor devices may transmit sensor data according to the TDMA channel allocation process performed at block 410. Therefore, as part of the portion of the timeslot reserved for a particular sensor device, that particular sensor device may transmit data to a network host system. The data transmitted during the sensor device's assigned timeslot can include data such as: the identifier of the sensor device, a battery level of the sensor device, magnetometer measurements of the sensor device, signal strength measurements of the assigned device, a state of the device, a determined state of a parking space in which the sensor device is installed, etc. While these examples of data are focused on wireless parking sensor devices, other types of wireless sensor devices (or wireless or wired devices) in general may result in other types of data being transmitted during the assigned timeslot.

At block 440, a sensor device may measure sensor data. The sensor device may determine that this sensor data is in some way urgent at block 450. The sensor device may have one or more stored conditions that are used to evaluate sensor data to determine whether the sensor data is urgent. For example, referring to a parking space sensor, if sensor data is indicative of a vehicle having arrived or left a parking space, the sensor data may be classified as urgent. In such a situation, the actual measurements (e.g., magnetometer measurements) may not need to be transmitted in an urgent fashion, but an indication of the data, such as an indication of whether the parking space is occupied or not (e.g., a state change) may be transmitted as urgent. Various thresholds used to analyze data may be used by the sensor device to categorize whether the sensor data is urgent. If not urgent, the data may be stored and transmitted to the network host system during the device's assigned timeslot.

At block 460, an urgent message indicative of the sensor data may be transmitted during the next grant-free transmission window. The urgent message may include data that is indicative of the sensor data and the identifier of the sensor device. The data indicative of the sensor data may be as small as a single bit. For example, for a parking space sensor, a single bit may be used to indicate whether a vehicle is or is not present within the parking space in which the parking space sensor is installed. In other embodiments, a greater number of bits may be used to represent the sensor data. The urgent message may be transmitted based on the determination at block 450 that the sensor data is urgent. The urgent message that is transmitted as part of block 460 may be transmitted during a grant-free transmission window of a timeslot that is assigned to a different sensor device. Therefore, while the transmitting sensor device does not have permission to transmit during the timeslot in general, the sensor device can transmit during the grant-free transmission window of the timeslot, which has been reserved for any sensor device to transmit an urgent message.

In some embodiments, the data to be transmitted during the grant-free transmission window does not need to be classified as urgent. Rather, the sensor device may have non-urgent data available to transmit and, therefore, may transmit during a grant-free transmission window. In some embodiments, the number of retries for transmission until an acknowledgment is received may be based on the urgency level of the data.

Figure 5:
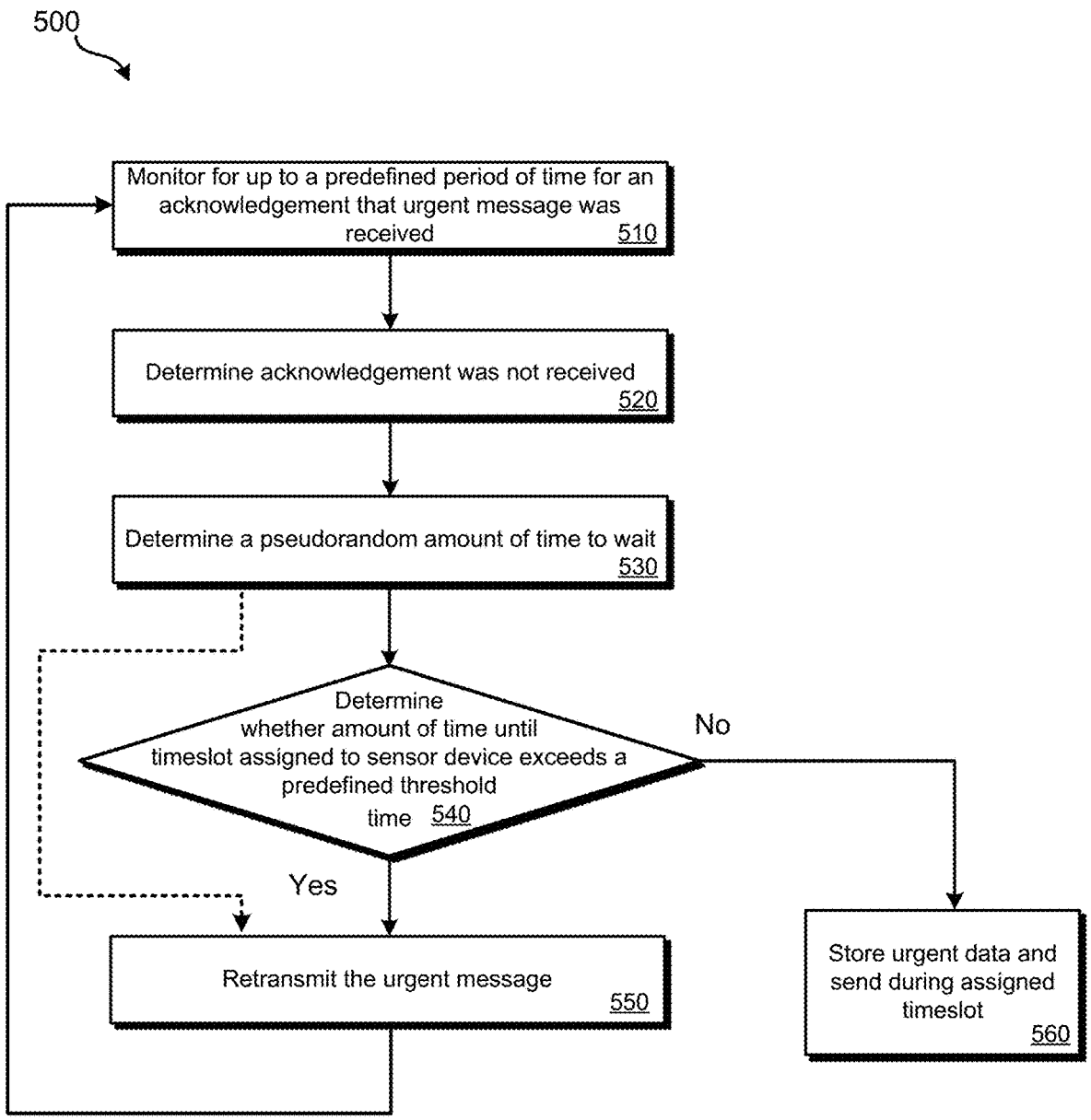
FIG. 5 illustrates an embodiment of a method for expediting sensor reporting in a hybrid TDMA shared-medium network in which an acknowledgement has not been received.

FIG. 5 illustrates an embodiment of a method 500 for expediting sensor reporting in a hybrid TDMA shared-medium network in which an acknowledgement has not been received. Method 500 may be performed in part by a network host system that is in communication with or is incorporated as part of an access point (AP). For example, an AP may communicate wirelessly with each device that communicates using the hybrid TDMA shared-medium network. Method 500 may be performed as part of or following method 400.

At block 510, a sensor device may monitor for up to a predefined period of time for an acknowledgment from a network host system that an urgent message transmitted during a grant-free transmission window has been received. For example, this urgent message may have been transmitted at block 460 of method 400. The sensor device may store an indication of a predefined acknowledgement period of time for which the sensor device may monitor for an acknowledgment message from the network host system. If an acknowledgment is successfully received by the sensor device, the sensor device may need to take no further action because the urgent message was successfully received by the network host system. However, at block 520, an acknowledgment message may be determined to have not been received by the sensor device. Therefore, the urgent message can be assumed to have not been received by the network host system. For example, a collision with data transmitted by another sensor device during the same grant-free transmission window may have occurred.

In some embodiments, at block 530, in response to determining that the acknowledgment was not received, the sensor device may determine a pseudorandom amount of time to wait before retransmitting the urgent message. In some embodiments, the pseudorandom amount of time is based on the identifier of the sensor device. As such, if multiple sensor devices initially transmitted during the same grant-free transmission window, by the pseudorandom amount of time being based on different identifiers for each sensor device, the sensor devices may likely retransmit the urgent message during different future grant-free transmission windows.

In some embodiments, method 500 may proceed to block 550 from block 530. In such embodiments, the urgent message may be retransmitted during a future grant-free transmission window that occurs next after the pseudorandom amount of time of block 530. In other embodiments, method 500 may proceed to block 540 from block 530. At block 540, the sensor device may make a determination whether the amount of time until the next timeslot assigned to the sensor device exceeds a predefined time threshold. If it does, method 500 may then proceed to block 550. If it does not, method 500 may proceed to block 560, at which the urgent data may be stored and then sent during the sensor device's assigned timeslot. The reasoning behind this is that, if a relatively short amount of time exists until the sensor device's next assigned timeslot, there is little advantage to transmitting during a grant-free transmission window.

Following the retransmission of block 550, method 500 may return to block 510. If acknowledgment is received, method 500 may conclude. If acknowledgment is again not received, method 500 may continue to be repeated until its acknowledgment is received or a predetermined amount of attempts to retransmit is performed.

Figure 6:
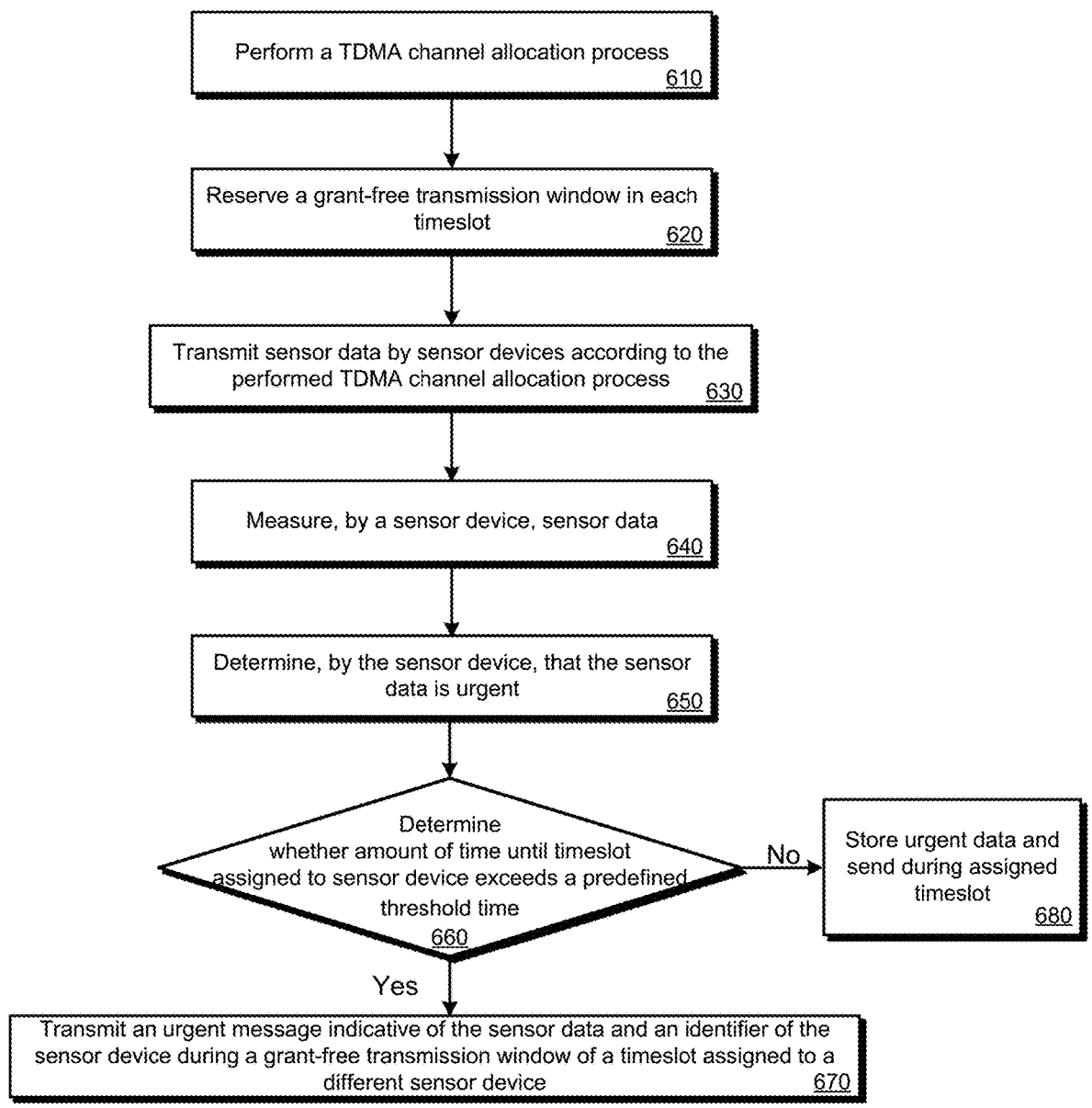
FIG. 6 illustrates an embodiment of a method for expediting sensor reporting in a hybrid TDMA shared-medium network in which use of a grant-free transmission window is dependent on how much time remains until an assigned timeslot.

FIG. 6 illustrates an embodiment of a method 600 for expediting sensor reporting in a hybrid TDMA shared-medium network in which use of a grant-free transmission window is dependent on how much time remains until an assigned timeslot. Method 600 may be performed in part by a network host system that is in communication with or is part of an access point (AP). For example, an AP may communicate wirelessly with each device that communicates using the hybrid TDMA shared-medium network. Method 600 can represent a more detailed embodiment of method 400 of FIG. 4.

At block 610, a TDMA channel allocation process may be performed. The TDMA channel allocation process can include the network host system assigning a timeslot to each device that is to communicate using the hybrid TDMA shared-medium network. An indication of the timeslot may be sent to the corresponding device. These devices may be sensor devices, such as parking space sensor devices that reside within parking spaces and use a magnetometer to detect whether a vehicle is present within the parking space. Following block 610, a separate timeslot may be assigned to each device.

At block 620, within each timeslot, a grant-free transmission window may be reserved by the network host system. Within the grant-free transmission window, any device that communicates as part of the hybrid TDMA shared-medium network may be permitted to transmit data without being explicitly authorized to do so during that window. In contrast, during the portion of the timeslot assigned to a particular device, only that particular device is permitted to transmit. Block 620 can include the network host system transmitting an indication to each device on the hybrid TDMA shared-medium network that indicates the duration and location of grant-free transmission windows within the timeslots.

At block 630, sensor devices may transmit sensor data according to the TDMA channel allocation process performed at block 410. Therefore, as part of the portion of the timeslot reserved for a particular sensor device, that particular sensor device may transmit data to a network host system. The data transmitted during the sensor device's assigned timeslot can include data such as: the identifier of the sensor device; a battery level of the sensor device; magnetometer measurements of the sensor device; signal strength measurements of the assigned device; a state of the device; a determined state of the parking space in which the sensor device is installed; etc. While these examples of data are focused on parking sensor devices, other types of sensor devices or devices in general may result in other types of data being transmitted during the assigned timeslot. The data transmitted by a sensor device during a sensor device's assigned window may include urgent data, non-urgent data, or both.

At block 640, a sensor device may measure sensor data. The sensor device may determine that this sensor data is in some way urgent at block 650. The sensor device may have one or more stored conditions that are used to evaluate sensor data to determine whether the sensor data is urgent. For example, referring to a parking space sensor, if sensor data is indicative of a vehicle having arrived or left of parking space, the sensor data may be classified as urgent. Other ways of analyzing data may be used by the sensor device to categorize whether the sensor data is urgent. If not urgent, the data may be stored and transmitted to the network host system during the device's assigned timeslot.

At block 660, the sensor device may determine an amount of time until the next timeslot that is specifically assigned to the sensor device. If the amount of time until the next timeslot assigned by the sensor device exceeds a stored predefined threshold time period, method 600 may proceed to block 670. However, if the determination at block 660 is that the amount of time until the next timeslot assigned to the sensor device does not exceed the stored predefined threshold time period, method 600 may proceed to block 680. At block 680, the urgent data may be stored and sent to the network host system during the sensor device's assigned timeslot. Such an arrangement may help prevent the sensor device from having to attempt to transmit during a grant-free transmission window if the sensor device's next assigned timeslot is within an amount of time that has previously been set as an acceptable amount of time to wait before the urgent data is received by the network host system.

At block 670, an urgent message indicative of the sensor data may be transmitted during the next grant-free transmission window. The urgent message may include data that is indicative of the sensor data and the identifier of the sensor device. The data indicative of the sensor data (or the state of the sensor device) may be a single bit or greater in size. For example, for a parking space sensor, a single bit may be used to indicate whether a vehicle is or is not present within the parking space in which the parking space sensor is installed. In other embodiments, a greater number of bits may be used to represent the sensor data. The urgent message may be transmitted based on the determination at block 650 that the sensor data is urgent and the determination of block 660. The urgent message that is transmitted as part of block 460 may be transmitted during a grant-free transmission window of a timeslot that is assigned to a different sensor device. Therefore, while the transmitting sensor device does not have permission to transmit during the timeslot in general, the sensor device can transmit during the grant-free transmission window of the timeslot, which has been reserved for any sensor device to transmit an urgent message.

Figure 7:
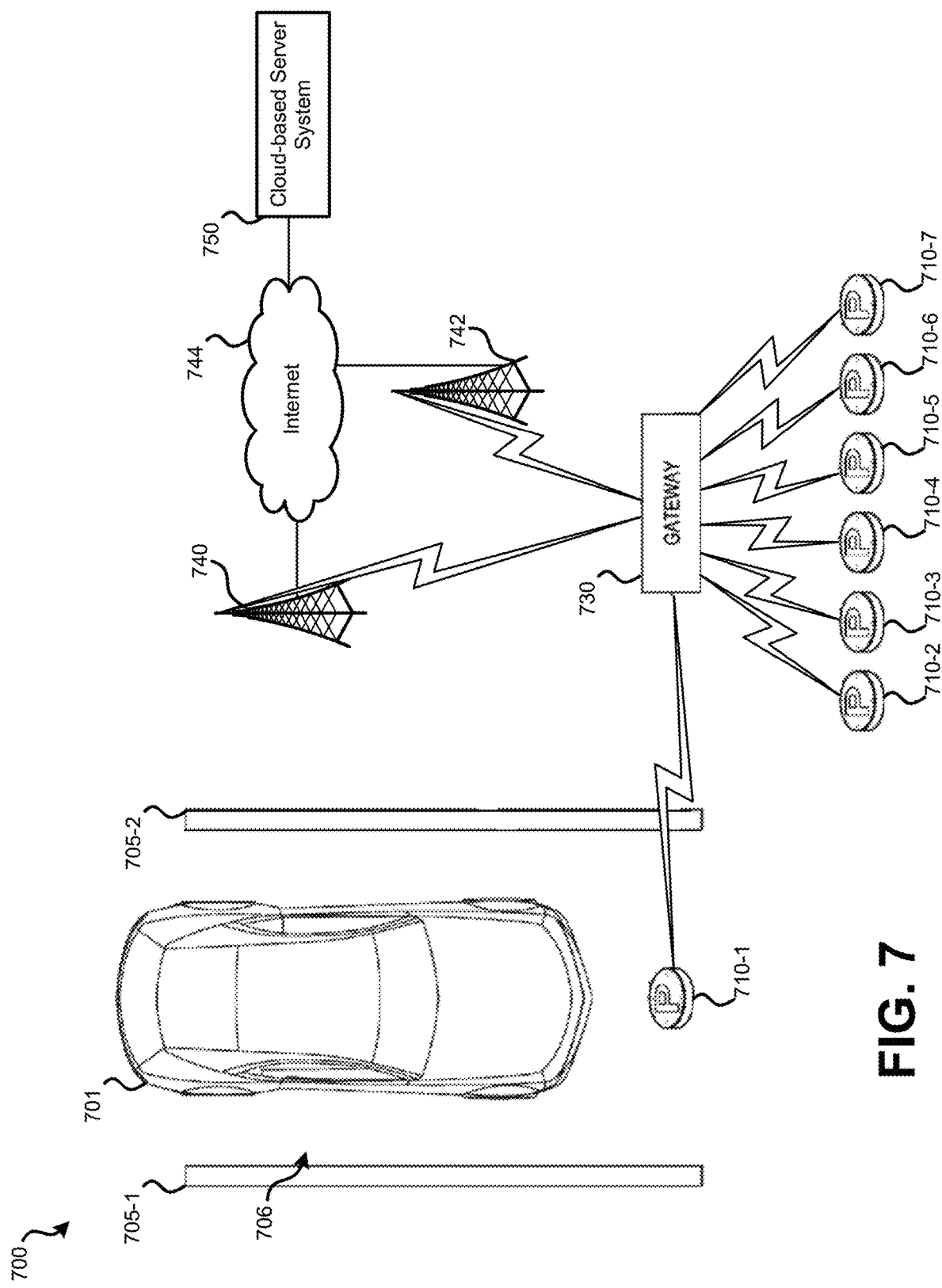
FIG. 7 illustrates an embodiment of a parking sensor system that can use a hybrid TDMA shared-medium network for parking sensor reporting.

FIG. 7 illustrates an embodiment of a parking sensor system 700 that can use the hybrid TDMA shared-medium network arrangements detailed in relation to FIGS. 2-6. Parking sensor system 700 may include: vehicle 701; parking sensors 710 (illustrated as parking sensors 710-2, 710-3, 710-4, 710-5, 710-6, and 710-7 in FIG. 7); gateway 730; cellular network 740 (e.g., 3G, 4G, 5G, or more advanced cellular networks); narrow-band internet of things (NB-IoT) network 742; the Internet 744; cloud-based server system 750. It should be understood that in some embodiments, not all components may be present.

Vehicle 701 may be a car, truck, motorcycle, scooter, or any other form of vehicle that is typically parked when not in use. Vehicle 701 may be operated by a private owner or by a company as part of a vehicle fleet. Vehicle 701 may park in a defined parking space, such as a parking space 706, which is defined by parking space border lines 705 (105-1 and 705-2). Within parking space 706, parking sensor device 710-1 may be installed. In-space parking sensor device (also referred to as a "parking sensor") 710-1 may, for example, be attached to the ground within parking space 706 such that when a vehicle, such as vehicle 701, parks in parking space 706, vehicle 701 is positioned above parking sensor device 710-1. Parking sensors 710 may each use magnetometers to detect a vehicle's presence in or absence from parking spaces.

Parking sensor device 710-1 may communicate wirelessly with various other components of parking sensor system 700. Parking sensor device 710-1 may communicate with gateway 730, which can function as the wireless network host. Gateway 730 may serve as a wireless network host that communicates with a plurality of parking sensors (e.g., parking sensors 710). Gateway 730 and parking sensors 710 may use a low-power wireless communication protocol to communicate.

Data from parking sensors 710 may be communicated to cloud-based server system 750 via Internet 744. In some embodiments, Gateway 730 may use cellular network 740 to communicate with cloud-based server system 750 via Internet 744. In other embodiments, gateway 730 may use NB-IoT network 742 to communicate with cloud-based server system 750. NB-IoT network 742 may allow for a small amount of data to be transmitted over relatively large distances. NB-IoT is classified as a low power wide area network (LoPWAN). NB-IoT network 742 may limit the bandwidth to a single narrow-band of 200 kHz. Data transfer rates may be limited to 70 Mbit/s or slower for downlink communications to devices and 5 Mbit/s or faster for uplink communications from the devices. Further detail regarding cloud-based server system 750 is provided in relation to FIG. 4. In other embodiments, a different type of wireless network may be used.

While the embodiments detailed herein are focused on parking sensor arrangements, it should be understood that the hybrid TDMA shared-medium network embodiments can be applied to other types of sensor devices or, more generally, other types of devices.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for expediting sensor reporting in a wireless hybrid time division multiple access (TDMA) shared-medium network, the method comprising:
    performing, by a wireless network host system, a TDMA channel allocation process for the wireless hybrid TDMA shared-medium network such that each sensor device of a plurality of sensor devices is assigned a different timeslot of a plurality of timeslots for data transmissions on the wireless hybrid TDMA shared-medium network;
    reserving within each timeslot of the plurality of timeslots, a grant-free transmission window, wherein any sensor device of the plurality of sensor devices is permitted to transmit data during any grant-free transmission window;
    measuring, by a sensor device of the plurality of sensor devices, sensor data;
    determining, by the sensor device, the sensor data is to be transmitted to the wireless network host system prior to a next assigned timeslot assigned to the sensor device; and
    in response to the sensor device determining the sensor data is to be transmitted, transmitting, by the sensor device, a message comprising the sensor data and an identifier of the sensor device entirely within a grant-free transmission window of a timeslot assigned to a different sensor device of the plurality of sensor devices.

2. The method for expediting sensor reporting in the wireless hybrid TDMA shared-medium network of claim 1, the method further comprising:
    transmitting, by the wireless network host system, in response to receiving the message indicative of the sensor data and the identifier of the sensor device during the grant-free transmission window of the timeslot assigned to the different sensor device of the plurality of sensor devices, an acknowledgement message indicative of the message having been successfully received by the wireless network host system.

3. The method for expediting sensor reporting in the wireless hybrid TDMA shared-medium network of claim 1, the method further comprising:
    determining, by the sensor device, after a defined period of time, that no acknowledgement message indicative of the message having been successfully received by the wireless network host system has been received by the sensor device;
    in response to determining that no acknowledgment message has been received, waiting a pseudo-random amount of time to retry transmission of the message; and
    after waiting the pseudo-random amount of time, transmitting, by the sensor device, the message during a second grant-free transmission window of a second timeslot assigned to a second different sensor device of the plurality of sensor devices.

4. The method for expediting sensor reporting in the wireless hybrid TDMA shared-medium network of claim 3, further comprising:
    calculating the pseudo-random amount of time based at least in part on the identifier of the sensor device.

5. The method for expediting sensor reporting in the wireless hybrid TDMA shared-medium network of claim 1, further comprising:
    determining, by the sensor device, an amount of time until the timeslot is assigned to the sensor device.

6. The method for expediting sensor reporting in the wireless hybrid TDMA shared-medium network of claim 5, further comprising:
    determining, by the sensor device, that the amount of time until the timeslot is assigned to the sensor device exceeds a defined threshold amount of time.

7. The method for expediting sensor reporting in the wireless hybrid TDMA shared-medium network of claim 6, wherein transmitting the message by the sensor device is further based on determining that the amount of time until the timeslot is assigned to the sensor device exceeds the defined threshold amount of time.

8. The method for expediting sensor reporting in the wireless hybrid TDMA shared-medium network of claim 1, wherein the message uses a single bit to represent the sensor data.

9. The method for expediting sensor reporting in the wireless hybrid TDMA shared-medium network of claim 1, wherein each sensor device of the plurality of sensor devices is a parking sensor that detects whether a vehicle is present in a parking space in which the parking sensor is installed.

10. The method for expediting sensor reporting in the wireless hybrid TDMA shared-medium network of claim 9, wherein each sensor device of the plurality of sensor devices comprises a magnetometer.

11. The method for expediting sensor reporting in the wireless hybrid TDMA shared-medium network of claim 1, further comprising:
    increasing a duration of each grant-free transmission window of the plurality of timeslots based on an increase in a number of sensor devices present in the plurality of sensor devices.

12. A hybrid time division multiple access (TDMA) shared-medium network system, comprising:
- a network host system that communicates with a plurality of sensor devices, wherein the network host system:
  - performs a TDMA channel allocation process for the hybrid TDMA shared-medium network such that each sensor device of the plurality of sensor devices is assigned a different timeslot of a plurality of timeslots for data transmissions on the hybrid TDMA shared-medium network; and
  - reserves, within each timeslot of the plurality of timeslots, a grant-free transmission window, wherein any sensor device of the plurality of sensor devices is permitted to transmit data during any grant-free transmission window; and
- the plurality of sensor devices, wherein a sensor device of the plurality of sensor devices:
  - transmits sensor data to the network host system during a timeslot of the plurality of timeslots assigned to the sensor device;
  - measures sensor data;
  - determines the sensor data is to be transmitted to the network host system prior to a next assigned timeslot assigned to the sensor device; and
  - transmits, in response to the sensor device determining the sensor data is to be transmitted to the network host system prior to a next assigned timeslot assigned to the sensor device, a message comprising the sensor data and an identifier of the sensor device entirely within a grant-free transmission window of a timeslot assigned to a different sensor device of the plurality of sensor devices.

13. The hybrid TDMA shared-medium network system of claim 12, wherein the network host system further:
- transmits, in response to receiving the message indicative of the sensor data and the identifier of the sensor device during the grant-free transmission window of the timeslot assigned to the different sensor device of the plurality of sensor devices, an acknowledgement message indicative of the message having been successfully received by the network host system.

14. A hybrid time division multiple access (TDMA) shared-medium network system, comprising:
- a network host system that communicates with a plurality of sensor devices, wherein the network host system:
  - performs a TDMA channel allocation process for the hybrid TDMA shared-medium network such that each sensor device of the plurality of sensor devices is assigned a different timeslot of a plurality of timeslots for data transmissions on the hybrid TDMA shared-medium network; and
  - reserves, within each timeslot of the plurality of timeslots, a grant-free transmission window, wherein any sensor device of the plurality of sensor devices is permitted to transmit data during any grant-free transmission window; and
- the plurality of sensor devices, wherein a sensor device of the plurality of sensor devices:
  - transmits sensor data to the network host system during a timeslot of the plurality of timeslots assigned to the sensor device;
  - measures sensor data;
  - determines the sensor data is to be transmitted to the network host system prior to a next assigned timeslot assigned to the sensor device;
  - transmits, in response to the sensor device determining the sensor data is to be transmitted to the network host system prior to a next assigned timeslot assigned to the sensor device, a message indicative of the sensor data and an identifier of the sensor device during a grant-free transmission window of a timeslot assigned to a different sensor device of the plurality of sensor devices;
  - determines, after a defined period of time, that no acknowledgement message indicative of the message having been successfully received by the network host system has been received by the sensor device;
  - waits a pseudo-random amount of time in response to determining that no acknowledgment message has been received; and
  - after waiting the pseudo-random amount of time, retransmitting, by the sensor device, the message during a second grant-free transmission window of a second timeslot assigned to a second different sensor device of the plurality of sensor devices.

15. The hybrid TDMA shared-medium network system of claim 14, wherein the sensor device calculates the pseudo-random amount of time based at least in part on the identifier of the sensor device.

16. The hybrid TDMA shared-medium network system of claim 12, wherein the sensor device determines an amount of time until the timeslot is assigned to the sensor device.

17. The hybrid TDMA shared-medium network system of claim 16, wherein the sensor device determines that the amount of time until the timeslot assigned to the sensor device exceeds a defined threshold amount of time.

18. The hybrid TDMA shared-medium network system of claim 17, wherein the sensor device transmits the message based on determining that the amount of time until the timeslot assigned to the sensor device exceeds the defined threshold amount of time.

19. The hybrid TDMA shared-medium network system of claim 12, wherein each sensor device of the plurality of sensor devices comprises: a wireless transceiver used to communicate via the hybrid TDMA shared-medium network, one or more processors, one or more non-transitory processor-readable mediums, and one or more sensors.

20. The hybrid TDMA shared-medium network system of claim 19, wherein each sensor device of the plurality of sensor devices is a parking sensor that detects whether a vehicle is present in a parking space in which the parking sensor is installed.

* * * * *